Feb. 2, 1960  O. W. HALE  2,923,021

WINDSHIELD WIPER BLADE ASSEMBLY

Filed Jan. 30, 1956

INVENTOR.
OWEN W. HALE
BY
Charles A. Penfold
ATTORNEY

United States Patent Office 2,923,021
Patented Feb. 2, 1960

2,923,021

WINDSHIELD WIPER BLADE ASSEMBLY

Owen W. Hale, Michigan City, Ind., assignor, by mesne assignments, to The Anderson Company, a corporation of Indiana Application January 30, 1956, Serial No. 562,110

6 Claims. (Cl. 15—245)

The invention relates generally to equipment for wiping windshields and more particularly is directed to a wiper blade assembly for wiping curved and flat windshields.

The majority of wiper blade assemblies now in use for wiping curved windshields includes a wiper blade unit and a pressure device. The blade unit preferably includes an elongate continuous resilient wiping element and an elongate flexible metal support for the element. The pressure device preferably includes a primary yoke provided with a connector for attachment with a wiper arm and a pair of metal secondary yokes having their ends operatively connected to the support at longitudinally spaced locations and their intermediate portions pivotally connected to the ends of the primary yoke.

In blade assemblies of the aforesaid character, the metal-to-metal contact, at least between the ends of the secondary yokes and their connection with the support for the wiping element creates some vibrations or noise, particularly as the blade assembly flips over at the beginning of its stroke in each direction across the surface of the windshield to be cleaned.

With the foregoing in mind, one of the principal objects of the subject invention is to reduce to a minimum any noise or vibrations occurring in the connections between the secondary yokes and the blade unit. This reduction in noise may be accomplished in various ways, but as disclosed herein provision is made to prevent a metal-to-metal contact between the secondary yokes and metal support for the wiping element.

More particularly in this regard, the blade unit is preferably provided with a plurality of longitudinally spaced fittings or connectors, constructed of some desirable resilient or nonmetallic material, such as a nylon plastic, to which the ends of the secondary yokes are attached.

Another object of the invention is to locate the flexible support within the confines of the wiping element and provide the sides of the element with recesses or slots which receive the fittings or connectors, with the recesses being so disposed that the connectors can be readily inserted therein.

A further object of the invention is to provide the connectors with seats on which the ends of the secondary yokes slide.

A specific object of the invention is to provide an arrangement of components whereby the connectors will extend into certain of the side recesses to engage the flexible support and thereby stabilize the connection between the support and wiping element.

Other attributes of the wiper blade assembly reside in the manner in which the components thereof are designed and constructed; ease of assembly and disassembly; stabilization of the connections between the pressure device and blade unit and control of the wiping element to obtain an efficient wiping action.

Additional objects and advantages of the invention will become apparent after the description hereinafter set forth is considered in conjunction with the drawing annexed hereto.

Figure 1:
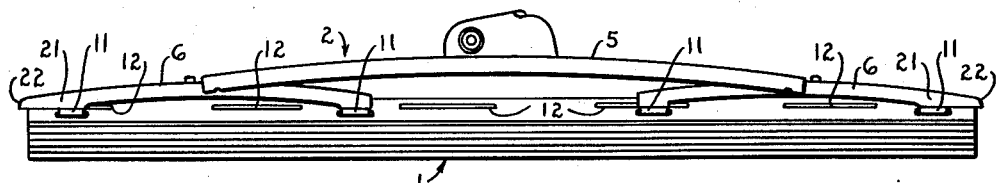
Figure 1 is an elevational side view of the wiper blade assembly.

Referring first to the embodiment of the invention illustrated in Figures 1 through 4 of the drawings, numeral 1 generally designates a wiper blade unit and 2 a pressure device operatively associated therewith.

The wiper blade unit preferably comprises an elongate resilient wiper element 3 and an elongate flexible support 4 therefor.

The pressure device preferably comprises a plurality of relatively movable members, such as an elongate bridge 5, provided with a fitting, as shown, for detachable connection with a wiper arm and a pair of secondary yokes 6 having their ends operatively associated with the blade unit and their intermediate portions pivotally connected to the ends of the primary yoke.

The resilient element 3 of the wiper blade unit may be designed and constructed in various ways, but as disclosed herein it includes, among other things, an attaching portion 7 and a wiping portion 8 joined to the attaching portion by an intermediate restricted portion or neck 9 so that the portion 8 may pivot with respect to the attaching portion 7 in a conventional manner. The attaching portion is preferably made tubular by providing a longitudinal opening 10 therein.

The flexible support 4 is slidably received and normally held in the tubular attaching portion of the element by the latter's inherent resiliency. In other words, the cross-dimensions of the longitudinal opening 10 and flexible support are preferably such that the attaching portion is stretched or placed under tension when the support is inserted into the opening. The cross-dimensions of the support are preferably generally rectangular, so as to permit the blade unit to freely flex in a plane substantially perpendicular to the surface to be cleaned, but prevent movement in a plane generally parallel to such surface.

The means preferably provided for affording the nonmetallic or resilient connections between the ends of the secondary yokes and the blade unit will now be described. This is preferably accomplished by providing the blade unit with a plurality of generally channel connectors or fittings 11 which operatively connect the secondary yokes to the blade unit. These connectors are attached to the wiping element before the flexible support is inserted into the opening in the element so that the support will lock the connectors to the blade when assembled with the element.

More particularly in this respect, the sides of the attaching portion 7 of the wiping element are preferably provided with upper rows of longitudinally extending relatively long recesses or slots 12 which are disposed in the plane of the longitudinal opening 10 and intersect the opening. The slots 12 on one side of the element are arranged in a staggered or alternate relationship with respect to the slots 12 on the other side of the element.

In other words, the slots on one side are not disposed directly opposite those on the other side. The wiping element is molded and this in part is accomplished by utilizing a plurality of transversely movable die sections which permit formation of the opening 10 without the use of a core extending the full length of the element. The transversely movable die sections also form the longitudinal slots 12. These slots serve a purpose which will be described subsequently.

Figure 2:
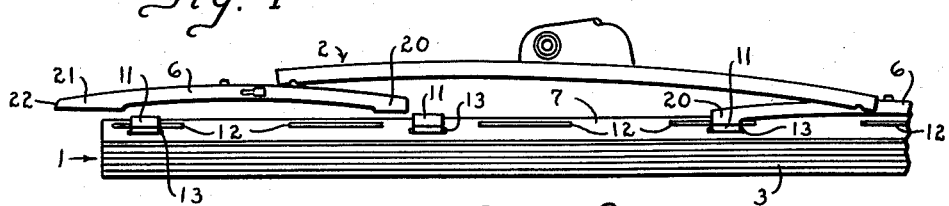
Figure 2 is an elevational side view of the blade assembly illustrated in Figure 1, showing the manner of detachably connecting the secondary yokes with the primary yoke and blade unit.

The sides of the attaching portion 7 of the wiping element are also preferably provided with a lower row of longitudinally spaced shorter slots 13 which are disposed below the plane of the opening 10. The slots 13 on one side of the element are disposed directly opposite the slots 13 on the other side of the element. Also, it will be noted that some of the slots 13 are arranged directly below some of the slots 12 and some therebetween as illustrated in Figures 1 and 2.

Each of the connectors 11 includes a top wall 14 having a convex surface and a pair of side walls 15 and 16 provided with corresponding inturned projections 17. The side wall 16 of each connector is also provided with an inturned finger 18 which is adapted for entry in a slot 12. Each connector is also preferably provided with overhanging portions 19 which are offset laterally from the side walls and provide seats or bearings for the ends of the secondary yokes. The connectors are preferably slid inwardly and lengthwise of the wiping element to substantially embrace a portion of the attaching portion 7 and so that the projections 17 on each connector will fit or snap into appropriate pairs of recesses or slots 13 and the finger 18 into one of the slots 12. After four connectors are attached to the element, the flexible support is slid into the opening 10 to stabilize the element and substantially lock the connectors thereto. Assembly of the connectors with the wiping element can be easily and quickly accomplished because the tubular attaching portion 7 of the wiping element is readily yieldable prior to insertion of the flexible support therein.

Attention is directed to the fact that although the side walls of the connectors straddle or embraceably engage the sides of the wiping element to afford some stabilizing influence between the element and support, the finger 18 on each connector extending through an upper slot 12 engages the support to provide additional stabilizing means by preventing any relative lateral displacement between the element and support. In other words, the support and element are given lateral support to prevent sidewise distortion of the element relative to the support which might otherwise take place due to the relative unstable condition of the upper portion of the element resulting from the upper rows of slots which provide only longitudinally spaced side wall portions defining the marginal side surfaces of the longitudinal opening 10.

Attention is also directed to the fact that the sizes and locations of the various recesses or slots may be varied, depending on the character of the connectors or means employed to operatively connect pressure-distributing members of a pressure device to a blade unit. As exemplified in Figures 1 and 2 of the drawing, the connectors are reversible. More specifically in this regard, the connectors which are respectively attached to the left ends of the secondary yokes are fastened to the blade in one position and the connectors attached to the right ends of these yokes are fastened to the blade in reversed positions. The connectors are thus alternately arranged, with the connector at the left end of the blade secured thereto with the projection 17 and finger 18 on one side wall of the connector respectively extending into the slots 13 and 12 at the front side of the element and the projection 17 on the other side wall of the connector extending into the lower slot 13 on the rear side of the wiping element, whereas the next connector is reversed so that the projection and finger on one side wall of the connector will register with slots on the rear side of the blade and a projection on the other side wall of this connector will register with a slot at the front side of the blade.

Figure 4:
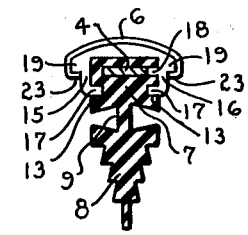
Figure 4 is a transverse section taken through an appropriate part of the blade assembly showing details of the construction.
Figure 3:
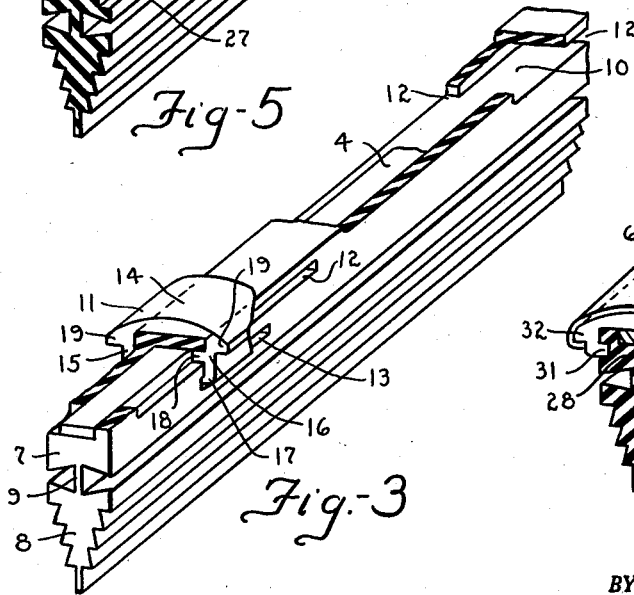
Figure 3 is a perspective view of the blade unit with portions in section and a connector mounted thereon.

The secondary yokes may be operatively connected to the connectors in various ways, but as herein disclosed the inner end of each secondary yoke is provided with an open-ended channel formation 20 and with an outer end channel formation 21 having an end wall 22. Each of these formations preferably includes a curved upper wall which more or less conforms to the upper surface 14 of each connector and inturned planar portions 23, as illustrated in Figure 4 of the drawing. The channel formations on the secondary yokes respectively slidably receive the overhanging or offset bearing portions 19 formed on the connectors. The connections between the channel formations of the secondary yokes and the connectors are such that very little, if any, relative transverse rocking movement occurs therebetween whenever the formations slide on the connectors and during oscillation of the blade assembly across a windshield. This arrangement, however, does serve to stabilize as well as control relative lateral and sliding movement between the blade unit and pressure device.

Relative longitudinal movement between the secondary yokes and blade unit is preferably determined by the end walls 22 on the outer channel formations of the secondary yokes which may engage the ends of the blade unit. Some relative longitudinal movement will occur between the connectors and blade unit and this is determined by the lengths of the projections 17 and/or fingers and the lengths of the slots in the wiping element. In lieu of this arrangement, provision could be made for effecting snap connections between the secondary yokes and connectors.

Any means suitable for the purpose may be employed to connect the ends of the primary yoke to the intermediate portions of the secondary yokes, but as disclosed herein each of the secondary yokes is preferably provided with a latch accessible through openings provided in the secondary yokes. The ends of the primary yoke are preferably provided with inturned projections which are received and held in the openings by the latches. With this setup the secondary yokes can be respectively slid inwardly for connection with the connectors therefor, after which the ends of the primary yoke can be connected to the secondary yokes. The connections between the various yokes and blade unit can also be effected in other ways, such as by connecting one of the secondary yokes to an end of the primary yoke and sliding this secondary yoke inwardly into connection with a pair of connectors and then sliding the other secondary yoke into connection with a pair of connectors, after which the opposite end of the primary yoke is connected to this last-mentioned secondary yoke, as exemplified in Figure 2 of the drawing.

Figure 5:
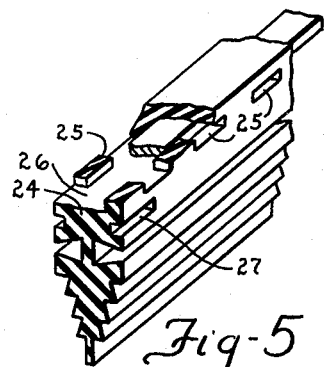
Figure 5 is a modified form of blade unit embodying the invention.

As above alluded to, the sizes and locations of the various recesses or slots such as 12 and 13 may be varied. One exemplification of such a variation is shown in Figure 5 of the drawing. In this modification, sides of an attaching portion 24 of a wiping element are provided with upper rows of relatively short slots 25 disposed in the plane of a longitudinal opening 26 formed in the attaching portion by transversely movable die sections. This attaching portion is also provided with a lower row of relative long slots 27. These lower slots, if found desirable, may be of the same length as the slots in the upper row depending on the length of the connectors employed in conjunction with this modified structure. The attaching portion 24 of the wiping element illustrated in Figure 5 is somewhat more stable than the element 3 above described for the reason that the upper row of slots are of a less longitudinal extent. The upper and lower rows of slots are preferably arranged in a manner generally corresponding to the slots 12 and 13 in the preferred embodiment above described and connectors like 11 are connectible with the element in a similar manner.

Figure 6:
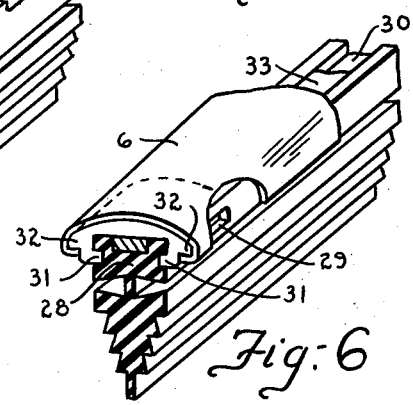
Figure 6 is another modified form of blade unit incorporating the invention.

The embodiment of the invention illustrated in Figure 6 of the drawing includes a wiper element provided with an attaching portion 28 having on opposite sides thereof rows of longitudinally spaced recesses or slots 29 preferably disposed in a plane below that of a longitudinal open recess 30 provided in the upper surface of the attaching portion. The attaching portion of the wiping element of this embodiment is not as stable as those above described, but the arrangement does afford a construction in which installation of the connectors is somewhat simplified. More specifically in this respect, each of the connectors employed in this embodiment includes an upper curved wall portion and side walls provided with inturned projections 31 which are detachably received in a pair of the opposed recesses 29. The side walls are also provided with offset portions 32 which may serve as bearings for the outer ends of the secondary yokes. The wiping element is reinforced by a longitudinally extending flexible support 33 which is held in the longitudinal recess by the connectors. In this embodiment, it is not necessary to provide each of the connectors with a finger like 18. Also, the arrangement is preferably such that the connectors are connected to the wiping element before the flexible support is slid into the longitudinal recess so that the connectors are locked to the wiping element as in the construction above described.

In view of the foregoing, it should be manifest that improved means have been employed for operatively connecting members of a pressure device with a wiper blade unit for the purpose of eliminating vibration or noise therebetween during operation of the blade assembly across a windshield. More specifically in this respect, it is believed that the use of nonmetallic or resilent connectors mounted on seats provided on the resilient wiping element constitutes a meritorious advance in the art.

Having thus described my invention, it is obvious that various modifications may be made in the same without departing from the spirit of the invention; and, therefore, I do not wish to be understood as limiting myself to the exact forms, constructions, arrangements and combinations of parts herein shown and described.

I claim:

1. A wiper blade comprising an elongate resilient element having a wiping portion for wiping a windshield, said element also having a back tubular portion, elongate resiliently flexible means disposed substantially within the confines of the tubular back portion and supporting the element, said back portion also having slots in its sides, spaced means carried by the element extending into the slots so they may engage the flexible means in a manner whereby to assist in stabilizing the position of said flexible means, and means connected to said spaced means for applying pressure to the blade.

2. An elongate resilient element for wiping a windshield, said element having a tubular portion and a wiping portion, elongate resiliently flexible supporting means disposed in the tubular portion, said element being provided with longitudinally spaced pairs of opposed seats, connector means mounted on said seats and extending over the element, a plurality of yokes having ends pivotally connected to the connector means, and bridge means operatively connected to said yokes for applying pressure thereto.

3. An elongate resilient element for wiping a windshield, said element having a wiping portion and a portion having a longitudinal opening therein for receiving resiliently flexible means supporting the element, said opening being formed by rows of slots with the slots respectively extending inwardly from the sides of the element and alternately arranged so that they are joined in an end-to-end relationship within the confines of the element to define said opening.

4. An elongate resilient element for wiping a windshield, said element having a tubular portion and a wiping portion, elongate resiliently flexible means disposed in the tubular portion for supporting the element, said tubular portion being provided with openings in its sides, and means carried by the element extending into the openings and engaging edge portions of the flexible means in a manner whereby to assist in stabilizing the position of said supporting means.

5. An elongate resilient element for wiping a windshield, said element having a wiping portion and a portion having a longitudinal opening therein, said opening being formed by rows of slots with the slots respectively extending inwardly from the sides of the element and alternately arranged so that they are joined in an end-to-end relationship within the confines of the element to define said opening, and resiliently flexible means disposed in the opening for supporting the element.

6. An elongate resilient element for wiping a windshield, said element having a wiping portion and a back portion provided with a longitudinal opening, elongate resiliently flexible means disposed in the opening for supporting the element, said back portion being provided with lateral openings, connector means carried by the element extending into the openings and intersecting the longitudinal opening engaging the flexible means in a manner whereby to assist in stabilizing the position of said flexible means, and a pressure device having ends operatively connected to the connector means for applying pressure thereto.

References Cited in the file of this patent

UNITED STATES PATENTS

| 2,543,383 | Scinta et al. | Feb. 27, 1951 |
| 2,596,063 | Anderson | May 6, 1952 |
| 2,700,785 | Oishei et al. | Feb. 1, 1955 |
| 2,760,220 | Deibel | Aug. 28, 1956 |
| 2,782,448 | Anderson | Feb. 26, 1957 |
| 2,807,821 | Scinta | Oct. 1, 1957 |

FOREIGN PATENTS

| 454,332 | Canada | Jan. 25, 1949 |
| 619,320 | Great Britain | Mar. 8, 1949 |

UNITED STATES PATENT OFFICE

CERTIFICATE OF CORRECTION

Patent No. 2,923,021                       February 2, 1960

Owen W. Hale

It is hereby certified that error appears in the above numbered patent requiring correction and that the said Letters Patent should read as corrected below.

Column 1, line 33, after "element" insert a comma; column 6, line 25, for "supporting" read -- flexible --; lines 41 and 42, strike out "intersecting the longitudinal opening" and insert the same in line 40, after "openings" and before the comma.

Signed and sealed this 12th day of July 1960.

(SEAL)
Attest:

KARL H. AXLINE
Attesting Officer

ROBERT C. WATSON
Commissioner of Patents